United States Patent Office 3,644,286
Patented Feb. 22, 1972

3,644,286
RETICULATED POLYAMIDES AND METHOD OF PREPARATION
Jean Odier, Antony, France, and Joerg Sambeth, Carouge, Geneva, and Friedrich Grundschober, Confignon, Geneva, Switzerland, assignors to Société Anonyme Francaise du Ferodo, Paris, France
No Drawing. Filed June 5, 1968, Ser. No. 784,959
Claims priority, application France, June 5, 1967, 109,040
(Filed under Rule 47(a) and 35 U.S.C. 116)
Int. Cl. C08g 33/02
U.S. Cl. 260—47 CP    25 Claims

ABSTRACT OF THE DISCLOSURE

Reticulated polyamide comprising divalent radicals and trivalent radicals which may be aliphatic or aromatic radicals, substituted or not, or a plurality of aromatic radicals linked together either directly or by at least one radical selected from the group comprising the alkyl, dioxy-alkyl, cyclanilidenes, —S—, —SO$_2$—, —O—, —CO— radicals, the divalent radicals and the trivalent radicals being linked together by the structure:

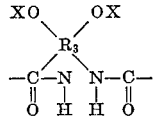

in which R$_3$ represents a tetravalent radical which may be an aromatic radical, substituted or not, or a number of aromatic radicals linked together directly or by at least one radical selected from the group of radicals recited above; X representing a hydrogen or at least one of the three radicals: R$_4$,

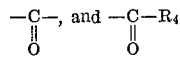

in which R$_4$ represents an alkyl or aryl radical having each OX group fixed directly on a carbon atom of the tetravalent radical, in the ortho or peri position with respect to the carbon atom on which is fixed the amide group —NH CO—, the ratio of the trivalent radicals to the divalent radicals being comprised between 1:20 and 1:5. The method of preparation comprises essentially the reaction of one or more diamine compounds with at least one compound of dicarboxylic acid and at least one compound of tricarboxylic acid.

---

The present invention has for its object to provide new condensation products and a method for their preparation. It is more particularly concerned with reticulated hydroxyl polyamide and alkoxyl polyamide and their preparation.

As polymers comprising nuclei of hydroxyl or alkoxyl amide in their main chains, the linear polyamides are already known.

These polymers, and more particularly the aromatic polyamides, have a fairly good stability under heat; they are soluble in certain organic solvents. These linear polymers find their applications as compositions of coatings and as shaped articles and as starting products for the manufacture of other polymer substances, such as linear aromatic polybenzoxazoles which are stable under heat, non-meltable and insoluble in organic solvents.

It is an object of the present invention to provide reticulated hydroxyl or alkoxyl polyamide, and more particularly reticulated aromatic polyamide which has a better stability under heat and greater resistance to chemical products than the known linear polyamides.

It is a further object of the present invention to obtain shaped articles and coatings constituted by reticulated polyamide.

Another object of the invention is to provide shaped articles constituted by reticulated polyamide, intended to be subsequently converted, by treatment described in detail in copending applications Ser. Nos. 784,960 and 784,961, filed under even date herewith, to shaped articles of reticulated polybenzoxazole which have still further improved physical properties.

Finally, it is another object of the present invention to provide a method of preparation of reticulated hydroxyl polyamide and reticulated alkoxyl polyamide.

The reticulated polyamide of the present invention comprises divalent radicals R$_1$ and trivalent radicals R$_2$ which may be aliphatic or aromatic radicals, substituted or not, or a number of aromatic radicals bound to each other either directly or by at least one of the radicals selected from the group comprising the alkyl, dioxy-alkyl, cyclanilidenes, —S—, —SO$_2$—, —O—, —CO— radicals, the said divalent radicals and the said trivalent radicals being coupled to each other by the structure:

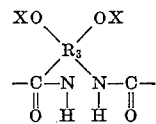

in which R$_3$ represents a tetravalent radical which may be an aromatic radical, substituted or not, or a number of aromatic radical, substituted or not, or a number of one of the radicals selected from the group comprising the alkyl, dioxy-alkyl, cyclanilidenes, —S—, —SO$_2$—, —O—, —CO— radicals; X representing hydrogen or at least one of the three radicals: R$_4$,

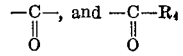

in which R$_4$ represents an alkyl or aryl radical, and in which each OX group is fixed directly on a carbon atom of the tetravalent radical in the ortho or para position with respect to the carbon atom on which is fixed the amide group —NHCO—, the ratio of the trivalent radicals to the divalent radicals being comprised between 1:20 and 1:1, and preferably between 1:20 and 1:5.

The reticulated polyamide of the present invention is solid and can be produced in the form of powder.

The amide constitution of the polymer according to the invention is clearly shown by the absorption bands at 3420 and 1670 cm.$^{-1}$ exhibited by their absorption spectrum in the infra-red.

The reticulated nature of the polyamide according to the invention is clearly shown by its non-meltability and insolubility in organic solvents and sulphuric acid, which differentiates it from the linear polyamides which are meltable and soluble in dimethyl-acetamide, dimethyl-sulfoxide, N-methyl-pyrrolidone and sulphuric acid.

The insolubility of reticulated polyamide becomes more pronounced as the degree of reticulation increases. Polyamides having a degree of reticulation at least equal to 5% are insoluble in solvents.

The method of preparation of reticulated hydroxyl or alkoxyl polyamide consists in causing the reaction of:

(a) At least one compound of diamine having the formula:

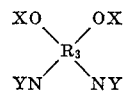

in which R$_3$ and X have the same meaning as above, Y representing two hydrogens or, when X is not hydrogen, the radical C=O, and in which each NY group is fixed directly on a carbon atom of the radical $R_3$ in the ortho or para position with respect to the carbon atom on which the group OX is fixed;

(b) At least one compound of dicarboxylic acid selected from the compounds corresponding to the formula:

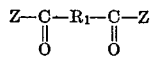

in which $R_1$ has the same meaning as above, Z representing a halogen or a group —O—$R_5$ in which $R_5$ is a monovalent radical chosen from the aromatic hydrocarbon radicals when Y represents two hydrogens, and a hydroxyl when Y represents the radical =C=O, and (c) at least one compound of tricarboxylic acid selected from the compounds complying with the formula:

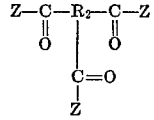

in which Z and $R_2$ have the same meaning as above, the ratio of the tricarboxylic acid compound to the dicarboxylic acid compound being comprised between 1:20 and 1:1, and preferably between 1:20 and 1:5, the number of

groups being identically the same as that of the groups —N=Y.

With regard to the diamine compound, there may be employed the hydroxyl or alkoxyl diamines or alternatively the derivatives of these latter.

As hydroxyl diamines, there will preferably be utilized the following diamines:

3,3'-dihydroxy-benzidine;
bis (3-amino-4-hydroxy)-biphenyl;
1,2-bis(3-hydroxy-4-amino-phenyl) ethane;
2,2 bis(3-hydroxy-4-amino-phenyl) propane;
bis (3-hydroxy-4-amino-phenyl);
bis (trifluoro-methyl) methane;
bis (3-hydroxy-4-amino-phenyl)ether;
bis (3-hydroxy-4-amino-phenyl) sulphide;
bis (3-hydroxy-4-amino-phenyl) sulphone;
bis (3-hydroxy-4-amino-phenyl) ketone;
bis (3-hydroxy-4-amino-phenyl) methane;
(3-hydroxy-4-amino-phenyl)-3-hydroxy-4-amino;
bis (3-amino-4-hydroxy-phenyl) ether;
bis (3-amino-4-hydroxy-phenyl) sulphide;
bis (3-amino-4-hydroxy-phenyl) ketone;
bis (3-amino-4-hydroxy-phenyl) methane;
1,2-bis (3-amino-4-hydroxy-phenyl) ethane;
2,2-bis (3-amino-4-hydroxy-phenyl) propane;
1,5-diamino-2,6-naphthalene diol;
1,6-diamino-2,5-naphthalene diol;
2,5-diamino-1,6-naphthalene diol;
2,6-diamino-1,5-naphthalene diol;
1,6-diamino-2,7-dihydroxy-naphthalene;
2,5-diamino-1,7-dihydroxy naphthalene;
1,7-diamino-2,6-dihydroxy naphthalene;
2,7-diamino-1,6-dihydroxy naphthalene;
2,7-diamino-3,6-dihydroxy naphthalene;
3,7-diamino-2,6-dihydroxy naphthalene;
1,5-diamino-4,8-dihydroxy naphthalene;
1,5-diamino-2,6-dihydroxy anthracene;
1,8-diamino-2,7-dihydroxy phenanthrene;
1,4-diamino-2,5-dihydroxy benzene;
1,3-diamino-4,6-dihydroxy benzene.

As alkoxyl diamines, there will preferably be employed the methoxyl diamines corresponding to the hydroxyl diamines recited above. With regard to the derivatives of alkoxyl diamines, there will preferably be utilized the diisocyanates of methoxyl diamines.

The choice of the compounds of dicarboxylic and tricarboxylic acids will be made according to the nature of the diamine compound utilized.

When the compound of hydroxyl or alkoxyl diamine is the diamine itself, the acid compounds are derivatives of the dicarboxylic and tricarboxylic acids, such as the dihalogenides and trihalogenides or the diesters and triesters of the said acids.

When the diamine compound is a di-isocyanate derivative of the corresponding alkoxyl diamine, the acid compounds are the acids themselves.

With regard to the compounds of dicarboxylic acid, the following acids or their derivatives will be employed: malonic acid; succinic acid; glutaric acid; adipic acid; pimelic acid; suberic acid; azelaic acid; sebacic acid; nonane-dicarboxylic acid and higher acid homologues; isophthalic acid; terephthalic acid; biphenyl-3,3'-dicarboxylic acid; biphenyl-4,4'-dicarboxylic acid; bis(3-carboxy-phenyl methane; bis(4-carboxy-phenyl) methane; 2,2-bis(3-carboxy-phenyl) propane; 2,2-bis(4-carboxy-phenyl) propane; 2,6-dicarboxylic naphthalene; bis(3-carboxy-phenyl) ether; bis(4-carboxy-phenyl) ether; bis(3-carboxy-phenyl) sulphide; bis(4-carboxy-phenyl) sulphide; bis(3-carboxy-phenyl) sulphone; and bis(4-carboxyphenyl) sulphone.

As derivatives of dicarboxylic acids, there can be employed the dihalogenides or the arylic diesters, more particularly the phenolic and naphtholic diesters.

With regard to the compounds of tricarboxylic acids, there will be employed the following acids or their derivatives: benzene-1,3,5-tricarboxylic acid (known commercially as trimesic acid); benzene-1,2,3-tricarboxylic acid; benzene-1,2,5-tricarboxylic acid; biphenyl-2,4,4'-tricarboxylic acid; biphenyl-2,3,4'-tricarboxylic acid; biphenyl-2,4,3'-tricarboxylic acid; biphenyl-3,4,4'-tricarboxyl sulphone; anthracene-1,2,4-tricarboxylic acid; naphthalene-1,2,7-tricarboxylic acid; naphthalene-1,2,4-tricarboxylic acid; naphthalene-1,4,5-tricarboxylic acid; triphenyl-methane-2,2',2''-tricarboxylic acid; bis(2-carboxy-phenyl) acetic acid.

As derivatives of tricarboxylic acids, there may be employed the trihalogenides or the arylic triesters, more particularly the phenolic and naphtholic triesters.

One manner of carrying into effect the method according to the present invention consists of poly-condensing, in the molten state, the diamine, the compound of dicarboxylic acid and the compound of tricarboxylic acid.

As compounds of carboxylic acid, there are chosen compounds from amongst the meltable compounds, and therefore the esters, and more particularly the phenolic and naphtholic esters of the dicarboxylic and tricarboxylic acids mentioned above.

A mixture of the starting substances is heated under agitation to a temperature and for the time necessary for the completion of the reaction.

The temperature must be above the melting point of the esters, but must not exceed 220° C. in order to prevent cyclization which might take place in certain cases.

The temperature will therefore be comprised between the melting point of the esters employed and 220° C.; preferably between 200° and 220° C.

The period of the reaction depends on the degree of condensation desired. If it is desired to obtain a polymer having a large number of reactive terminal groups, the duration of the reaction will be regulated in such manner as to obtain a low degree of condensation.

The product obtained is produced in the form of a solid mass which can be reduced to powder and which lends itself to moulding.

The reaction may also be carried out directly in a mould at the temperatures indicated above, under pressures which may reach 1500 kg./sq. cm.

It is also possible to proceed in the presence of a filler substance.

When the diamine compound employed is a methoxyl di-isocyanate, the dicarboxylic acids and the tricarboxylic acids themselves will be employed as the carboxylic compounds.

In this case, the di-isocyanate, the dicarboxylic acid and the tricarboxylic acid are intimately mixed, and the mixture is heated to a temperature comprised between 150° and 250° C., preferably between 200° and 220° C., for a duration sufficient for the completion of the reaction. The poly-condensation is effected with liberation of carbon dioxide.

The reticulated polyamides may also be obtained by other methods of poly-condensation which are in general use, such as poly-condensation in solution and interfacial poly-condensation.

In the case of poly-condensation in solution, there are employed as acid compounds the di-halogenides and tri-halogenides of dicarboxylic and tricarboxylic acids, preferably the chlorides.

The starting products are caused to react in an organic solvent and in the presence of pyridine as an acceptor of the acid formed, at a temperature comprised between $-10°$ and $+50°$ C., and for a time which depends on the degree of polymerization desired. With regard to the solvents, there will be employed organic liquids which are inert with respect to the reactants and which have a solvent power with regard to these latter, together with a jellifying power in respect to the polymer formed. There will preferably be used dimethyl-acetamide, dimethyl-formamide, N-methyl-pyrrolidone and dimethyl-sulphoxide. The reticulated polymer forms a kind of gel which is separated from the other constituents by precipitation in water.

Interfacial poly-condensation, which is carried out with the aid of an alkali compound as an acceptor of acid, has the advantage over poly-condensation in solution of being more economical, because it employs water as the reaction medium and avoids the expensive operation constituted by the recovery of the solvent and of the organic base.

The diamine will preferably be employed in the form of hydrochloride in an aqueous solution, and the acid compounds in the form of di-halogenides and tri-halogenides of acids dissolved in a solvent which is inert with respect to the starting products.

As the solvent of the acid compounds, ketones are utilized such as cyclo-hexanone and cyclo-heptanone, or halogenated aliphatic or aromatic hydrocarbons such as chloroform and chlorobenzene.

As the alkali compound, there will preferably be used an alkali carbonate, and more particularly sodium carbonate in an aqueous solution, or calcium carbonate in an aqueous suspension, in a quantity just sufficient for the neutralization of the acid formed during the course of the reaction.

The reaction consists of vigorously stirring the aqueous solution of diamine hydrochloride and the organic solution of the compounds of dicarboxylic and tricarboxylic acids, and then progressively adding the solution or the suspension of alkali carbonate. The polymer separates out easily by precipitation.

The temperature of the reaction is comprised between $-10°$ C. and $+30°$ C., preferably between 0° and 10° C. The reaction takes place instantaneously.

In the various ways of carrying into effect the method according to the present invention, the reticulated polyamide are obtained directly from diamine compounds, dicarboxylic and tricarboxylic acid compounds. The invention provides for an alternative form of the method, in which the diamine is first reacted with the compound of dicarboxylic acid, after which the compound of tricarboxylic acid is added in a subsequent stage of the method. This second stage can be carried out immediately following the first, or later.

According to this alternative form, one of the ways of carrying into effect the first stage of the method consists of poly-condensing the diamine in the molten state with the compound of dicarboxylic acid.

As compounds of carboxylic acids, there are chosen compounds from the meltable compounds, namely esters, and more particularly the phenolic and naphtholic esters of the dicarboxylic acids recited above.

Another way of carrying out the first stage of the alternative form of method according to the invention consists of effecting an interfacial poly-condensation of the diamine with the dicarboxylic acid compound, with the aid of an alkali compound as an acid acceptor and water as the reaction medium.

The linear hydroxyl polyamide can also be obtained by poly-condensation in solution.

In this case, the di-halogenides of dicarboxylic acids, and preferably the chlorides are employed as the acid compounds.

The product obtained in the form of a solid meltable mass, soluble in a certain number of organic solvents, can be powdered and lends itself to moulding; it is a hydroxyl polyamide having a terminal group $NH_2$ at each of the extremities of the chain and two —OH groups in each of its structural units.

The amide constitution of the polymer is clearly brought out by the absorption bands at 3420 and 1670 cm.$^{-1}$ shown by their absorption spectrum in the infrared.

The linear nature of the polymer is clearly shown by its meltability and its solubility in a certain number of organic solvents, and more particularly dimethylacetamide, dimethyl-sulphoxide and N-methyl-pyrrolidone.

One manner of carrying into effect the second stage of the alternative form of the method according to the invention consists of reticulating the linear hydroxyl polyamide obtained during the first stage of the process. Reticulation is effected by poly-condensation in the molten state of the said linear polyamide with a compound of tricarboxylic acid.

As compounds of tricarboxylic acid, there are chosen compounds taken from the meltable compounds, namely esters, and more particularly phenolic and naphtholic esters of the tricarboxylic acids mentioned above.

The reticulation is effected, on the one hand by virtue of the terminal $NH_2$ groups of the linear polyamide, with formation of amide bonds, and on the other hand by means of the OH groups comprised in each of the structural units, with formation of ester bonds. All the OH groups do not react and the polymer obtained is a reticulated hydroxyl polyamide containing ester groups.

The mixture of linear polyamide and ester of tricarboxylic acid is heated while stirring to a temperature and for the time necessary for the completion of the reaction.

The temperature will be higher than the melting point of the esters but must not exceed 220° C. so as to avoid cyclization which could take place in certain cases. The temperature will therefore be comprised between the melting point of the esters employed and 220° C., preferably between 200° and 220° C.

The product is obtained in the form of a solid mass which can be powdered and lends itself to moulding.

This reaction during the second stage can also be carried out in a mould, in which there is introduced a mixture of linear polyamide and ester of tricarboxylic acid. The procedure is carried out at the temperatures indicated above and at pressures which may reach 1500 kg./sq. cm. It is also possible to proceed in the presence of a filler substance.

The reaction is carried out more readily when the molecular weight of the linear polyamide is lower. In consequence of its low viscosity, the linear polyamide with a low molecular weight lends itself particularly well to direct reaction inside the mould.

As already indicated above, the second stage of the alternative form of method according to the invention can be carried out immediately following the first, or subsequently.

Reticulated hydroxyl or alkoxyl polyamide lends itself to moulding and to all the other applications usual with polymers, such as formation of films, coatings, etc.

It is possible to add filler substances of any kind, mineral or organic to the polyamide before it is shaped. Organic fillers can play the part of plastifying agents.

The shaped articles composed of reticulated polyamide can be employed in their actual state. It is however preferable to utilize them after conversion of the reticulated polyamide of which they are formed to reticulated polybenzoxazoles, as described in detail in the two applications referred to above. These products of reticulated polybenzoxazole have physical properties which are still superior to those of the corresponding reticulated polyamide.

The method according to the invention can be carried into effect as indicated in the following examples, given by way of indication and without constituting any limitation of the invention.

EXAMPLE 1

A mixture of 44.97 grams (0.208 mol.) of dihydroxybenzidine, 59.7 grams (0.1875 mol.) of phenolic diester of isophthalic acid and 5.97 grams (0.0136 mol.) of phenolic triester of trimesic acid is heated while stirring to 200° C. under vacuum. There is formed a molten mass which is separated from the phenol formed by distillation. The heating is stopped after 40 minutes (counting from complete melting) and the product is cooled. There is obtained a solid mass which is reduced to powder and treated several times with ethanol to eliminate the unreacted ester and the phenol. The product is then washed with dilute hydrochloric acid to eliminate all traces of dihydroxy-benzidine and is then rinsed with water until it is neutral. The yield is 94%. The polymer obtained is insoluble in all organic solvents and also in sulphuric acid, which indicates the reticulated nature of the polymer. Its polyamide structure is indicated by its infra-red spectrum (bands at 3420 cm.$^{-1}$ and 1670 cm.$^{-1}$).

EXAMPLE 2

21.6 grams (0.1 mol.) of dihydroxy-benzidine are dissolved in a mixture of 25 ml. of pyridine and 250 ml. of dimethyl-acetamide, after which the solution formed is cooled to 0° C. To this solution, there is added slowly a solution of 18.3 grams (0.09 mol.) of dichloride of isophthalic acid and 77 grams (0.067 mol.) of trichloride of trimesic acid in 70 ml. of cyclo-hexanone for 15 minutes. The mixture is left to react for 2 hours. There is formed a kind of gel which is poured into water. The precipitated polymer is filtered, washed with dilute hydrochloric acid, then with water and afterwards with acetone. The yield is 98%. The polymer obtained is insoluble in all organic solvents, which indicates the reticulated nature of the polyamide.

EXAMPLE 3

17.5 grams (0.0605 mol.) of hydroxy-benzidine hydrochloride are dissolved in 350 ml. of water and the solution is cooled to 2° C. The solution is mixed while vigorously stirring with a solution of 11 grams (0.05425 mol.) of isophthalic acid chloride and 1.1 grams (0.00415 mol.) of trimesic acid chloride in 70 ml. of cyclo-hexanone, and there is added slowly for 15 minutes a solution of 13 grams (0.1227 mol.) of sodium carbonate in 150 ml. of water. The polymer is precipitated. After 1 hour, the PH value is adjusted by adding sodium carbonate. After one night, the PH value is reduced to 6 and the mixture is filtered. The polymer is washed once with dilute HCl, once with an aqueous solution of NaHCO$_3$, three times with water and once with acetone. The polymer is dried for 2 hours at 150° C. Yield 20.06 grams (96.5%) of the theoretical quantity.

EXAMPLE 4

24.4 grams (0.1 mol.) of dimethoxy-benzidine are intimately mixed with 28.6 grams (0.09 mol.) of phenolic diester of isophthalic acid and 2.92 grams (0.067 mol.) of phenolic triester of trimesic acid, after which the mixture formed is heated to 200° C. The mixture melts and the phenol formed is separated by distillation. The heating is stopped at the end of one hour and the mixture is cooled. The mass formed is then ground and the powder obtained is then treated several times with ethanol and with acetone in order to eliminate the unreacted ester and the phenol. The polymer obtained is insoluble in all organic solvents and also in sulphuric acid. The yield is 88%.

EXAMPLE 5

24.4 grams (0.1 mol.) of dimethoxy-benzidine are dissolved in tetra-hydrofuran, to which has been added 11.6 grams (0.11 mol.) of sodium carbonate in 500 ml. of water. To this solution there is added, while stirring, a solution of 18.3 grams (0.09 mol.) of dichloride of isophthalic acid and 1.77 grams (0.067 mol.) of trichloride of trimesic acid in 100 ml. of tetra-hydrofuran. The polymer is immediately precipitated. At the end of 1 hour, the polymer is filtered and then rinsed with dilute hydrochloric acid, water and acetone. The yield is 96%.

EXAMPLE 6

31.7 grams (0.1 mol.) of methoxy-benzidine hydrochloride are dissolved in water, and there is added a solution of 18.3 grams (0.09 mol.) of dichloride of isophthalic acid and 1.77 grams (0.0067 mol.) of trichloride of trimesic acid in 100 ml. of cyclo-hexanone. While stirring vigorously there is added to this mixture a solution of 23.4 grams (0.22 mol.) of sodium carbonate at 5° C. The polymer precipitates immediately. At the end of 2 hours, the polymer is filtered, washed with dilute hydrochloric acid and then rinsed with water and with acetone. The yield is 94%. The polymer is insoluble in all solvents.

EXAMPLE 7

21.6 grams (0.1 mol.) of dihydroxy-benzidine and 20 ml. of pyridine are dissolved in 500 ml. of dimethylacetamide. To this solution there is added while stirring a solution of 16.5 grams (0.09 mol.) of dichloride of adipic acid and 1.77 grams (0.0067 mol.) of trichloride of trimesic acid in 100 ml. of cyclo-hexanone. There is formed a gel from which the polymer is precipitated by pouring into water. The product is then filtered, washed with dilute hydrochloric acid, water and acetone. The polymer is insoluble.

EXAMPLE 8

14.0 grams (0.1 mol.) of dihydroxy-diamino-benzene are dissolved in 500 ml. of water. To this solution is added 18.3 grams (0.09 mol.) of dichloride of isophthalic acid and 1.77 grams (0.0067 mol.) of trichloride of trimesic acid in solution in cyclo-hexanone. Then, for 15 minutes, there is introduced with vigorous agitation a solution of 11.6 grams (0.11 mol.) of sodium carbonate. The polymer is precipitated. After 2 hours, the product is separated by filtration, then washed several times with water and then with acetone. The polymer is not soluble in any solvent.

EXAMPLE 9

44.97 grams (0.208 mol.) of dihydroxy-benzidine, 59.7 grams (0.1875 mol.) of phenolic diester of terephthalic acid and 5.97 grams (0.0136 mol.) of phenolic triester of trimesic acid are mixed and heated to 180° C., after which the same procedure is followed as described for Example 1. The polymer obtained is insoluble.

EXAMPLE 10

24.4 grams (0.1 mol.) of dimethoxy-benzidine are mixed with 28.6 grams (0.09 mol.) of phenolic diester of isophthalic acid and 2.92 grams (0.067 mol.) of phenolic triester of trimellic acid. The same procedure is followed as given in Example 4. The polymer obtained is insoluble.

EXAMPLE 11

28.0 grams (0.13 mol.) of dihydroxy-benzidine, 31.8 grams (0.1 mol.) of phenolic diester of isophthalic acid, and 8.76 grams (0.02 mol.) of phenolic triester of trimesic acid are intimately mixed and the mixture is heated for 2 hours at 200° C. The phenol formed is eliminated under vacuum. When the product has been cooled down, it is washed with ethanol, with dilute hydrochloric acid and with water. The polymer is not soluble.

EXAMPLE 12

37.8 grams (0.175 mol.) of dihydroxy-benzidine, 31.8 grams (0.1 mol.) of phenolic diester of isophthalic acid, 21.9 grams (0.05 mol.) of phenolic triester of trimesic acid are mixed together, and the mixture is heated at 200° C. for 2 hours. The same procedure is followed as for Example 14. The polymer obtained is insoluble.

EXAMPLE 13

8.34 grams (0.0128 mol.) of 3,3'-dimethoxy-diphenylene - 4 - 4' - di-isocyanate are mixed with 5.01 grams (0.025 mol.) of isophthalic acid and 0.55 gram (0.00207 mol.) of trimesic acid are mixed together and heated to 220° C. Carbon dioxide is liberated.

The reaction is completed at the end of about 5 hours. After cooling, the substance is powdered, rinsed successively with soda and dilute sulphuric acid and then with water and is finally dried. The yield is 65%. The product obtained is insoluble in organic solvents.

EXAMPLE 14

38.6 grams (0.13 mol.) of dimethoxy-diphenylene-di-isocyanate are mixed with 16.6 grams (0.1 mol.) of isophthalic acid and 21 grams (0.02 mol.) of trimesic acid. The procedure is followed as described in Example 16. The product obtained has a higher degree of reticulation.

EXAMPLE 15

20 grams of the polyamide powder obtained as described in Example 1 is placed in a mould brought up to 150° C. After 3 minutes, the mould is compressed at 500 kg./sq. cm. for 1 minute. The polymer is obtained in the form of a moulded object.

EXAMPLE 16

20 grams of the polyamide powder obtained as in Example 1 are mixed with 50 grams of alumina, and the process is carried out as in Example 14. The polymer is also obtained in the form of a moulded object.

EXAMPLE 17

44.97 grams (0.208 mol.) of dihydroxy-benzidine are mixed with 59.7 grams (0.187 mol.) of phenolic diester of isophthalic acid, 5.97 grams (0.0136 mol.) of phenolic triester of trimesic acid and 60 grams of barium sulphate and the mixture is heated for 1 hour at 200° C. After cooling, the mass obtained is put into a mould and heated to 180° C., and is compressed at 1500 kg./sq. cm. for 3 minutes. The object formed is then removed from the mould and again heated for 1 hour at 180° C. The polymer is obtained in the form of a moulded object which is non-meltable and insoluble.

EXAMPLE 18

21.6 grams (0.1 mol.) of dihydroxy-benzidine are intimately mixed with 28.6 grams (0.09 mol.) of phenolic diester of isophthalic acid and the mixture is heated at 200° C. for 1 hour. After cooling, there is obtained a product which is still soluble in dimethyl-acetamide, soda and sulphuric acid. The polymer is therefore a linear polyamide. After the addition of 2.9 grams (0.0067 mol.) of phenolic triester of trimesic acid and heating for 1 hour at 200° C., the polymer is no longer soluble. The polyamide obtained is therefore reticulated.

EXAMPLE 19

21.6 grams (0.9 mol.) of 3,3'-dihydroxy-benzidine are mixed with 28.6 grams (0.09 mol.) of phenolic diester of isophthalic acid and the mixture is heated for 45 minutes at 200° C. After cooling, there are added 2.9 grams (0.0067 mol.) of phenolic ester of trimesic acid and 30 grams of alumina, after which the mass obtained is placed in a mould heated to 180° C. After 5 minutes, the mass is compressed for 3 minutes at 1,000 kg./sq. cm. The moulded object composed of reticulated polyamide is then removed from the mould and again heated for 60 minutes at 180° C.

EXAMPLE 20

17.5 grams (0.0605 mol.) of hydrochloride of 3,3'-dihydroxy-benzidine are dissolved in 350 ml. of water and the solution is cooled to 2° C. This solution is then mixed while stirring with a solution of 11 grams (0.05425 mol.) of chloride of isophthalic acid in 70 ml. of cyclohexanone, and there is added a solution of 13 grams (0.1227 mol.) of sodium carbonate in 150 ml. of water. The polymer is precipitated. After washing and drying, the powder of the polymer formed is mixed with 1.84 grams (0.004 mol.) of phenolic triester of trimesic acid and 30 grams of barium sulphate. The mixture is placed in a mould heated to 180° C. After 6 minutes at this temperature, the mixture is compressed at 1500 kg./sq. cm. for 2 minutes. The object formed is removed from the mould and again heated for 45 minutes at 200° C.

EXAMPLE 21

A rapid action colloid mill is employed (8,000 r.p.m.) accepting a useful load of about 3 litres, into which, for the purpose of a continuous process, there are passed, by repeating the operation 25 times, 9 kg. of hydrochloride of 3,3'-dihydroxy-benzidine in solution in 75 litres of water and 6.5 kg. of chloride of isophthalic acid in solution in 10 litres of cyclohexanone, and 7 kg. of calcium carbonate.

This apparatus produces a very vigorous internal mixing action by means of a circulation system. After about 5 minutes, the whole contents is transferred to a large receptacle in which the reaction can be completed for 1 hour while stirring. The polymer is then filtered and washed in a state of suspension by dilute solutions of HCl, $Na_2CO_3$, $NaHCO_3$, and then with water and acetone. The yield after drying is 95%.

28.5 grams of the polymer obtained is mixed with 7.5 grams of phenolic triester of trimesic acid, 5.2 grams of triphenyl-phosphate and 36 grams of aluminium oxide, after which a pastille is made at ambient temperature at a pressure of 500 kg./sq. cm. A pressure of 1,000 kg./sq. cm. is then applied for 60 seconds at a temperature of 120° C., after which the polymer is heated for 1 hour at 200° C., and the object thus formed is removed from the mould.

What we claim is:

1. Reticulated polyamide consisting essentially of the recurring structural formula

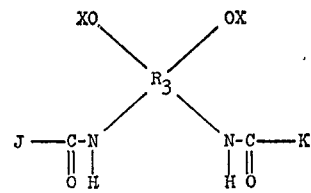

wherein $R_3$ is a tetravalent radical selected from the group consisting of

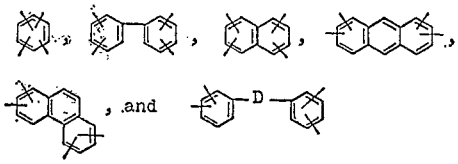

where D is selected from the group consisting of lower alkylene, oxygen, sulfur, —$SO_2$— and $$-\underset{\underset{O}{\|}}{C}-$$

and where each nitrogen atom is attached to a carbon atom of a ring of the aromatic tetravalent radical ortho or para to the carbon atom to which an —OX is directly attached; wherein J and K are either of the radicals $R_1$ or $R_2$ wherein $R_1$ is selected from the group consisting of alkylene of 1 to 10 carbon atoms,

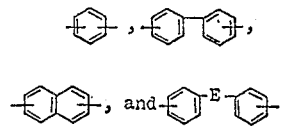

E being selected from the group consisting of alkylene of 1 to 3 carbon atoms, —O—, —S—, and —$SO_2$—, and wherein $R_2$ is selected from the group consisting of

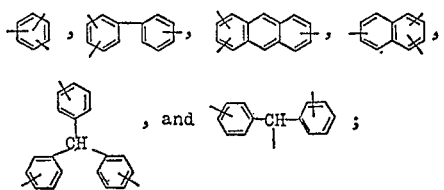

and wherein X is selected from the group consisting of hydrogen, lower alkyl and $$-\underset{\underset{O}{\|}}{C}-R_4$$

wherein $R_4$ is an alkyl or aryl radical; the ratio of said trivalent radicals to said divalent radicals being between 1:20 and 1:1.

2. A method of manufacture of reticulated polyamide as claimed in claim 1, comprising heating in the temperature range —10° C. to +220° C.

(a) at least one diamine compound having the formula:

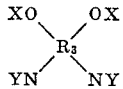

in which $R_3$ and X have the same meaning as in claim 1, Y representing two hydrogens or, when X is not a hydrogen, the radical =C=O, and in which each NY group is fixed directly on a carbon atom of the radical $R_3$ in the ortho or para position with respect to the carbon atom on which the group OX is fixed; with (b) at least one compound of a dicarboxylic acid, selected from the compounds corresponding to the formula:

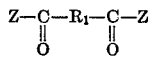

in which $R_1$ has the same meaning as above, Z representing a halogen to a group —O—$R_5$ in which $R_5$ is a monovalent aromatic hydrocarbon radical when Y represents two hydrogens and hydroxyl when Y represents the radical =C=O; and (c) at least one compound of a tricarboxylic acid selected from the compounds corresponding to the formula:

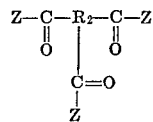

in which Z and $R_2$ have the same meaning as above, the ratio of the tricarboxylic acid compound to the dicarboxylic acid compound being between 1:20 and 1:1, the number of

groups being identical with that of the —N=Y groups.

3. A method of manufacture of reticulated polyamide as claimed in claim 1, comprising admixing (a) at least one diamine compound having the formula:

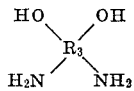

in which $R_3$ has the same meaning as above, each $NH_2$ group being fixed directly on a carbon atom of the radical $R_3$ in the ortho or para position with respect to the carbon atom on which the OH group is fixed; with (b) at least one compound of a dicarboxylic acid selected from the compounds which correspond to the formula:

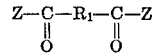

in which $R_1$ has the same meaning as above, Z representing a halogen or a group —O—$R_5$, wherein $R_5$ is a monovalent aromatic hydrocarbon radical so as to form a linear polyamide as a first step, and then, in a second step, said polyamide is heated with:

(c) at least one compound of a tricarboxylic acid, selected from the compounds corresponding to the formula:

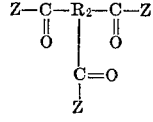

in which Z and $R_2$ have the same meaning as above, the ratio of the tricarboxylic acid compound to the dicarboxylic acid compound being comprised between 1:20 and 1:1, the number of

groups being identical with that of the —$NH_2$ groups.

4. A method as claimed in claim 2, in which said diamine compound is an aromatic hydroxyl diamine.

5. A method as claimed in claim 2, in which said diamine compound is an aromatic alkoxyl diamine.

6. A method as claimed in claim 4, in which said hydroxyl diamine is selected from the group consisting of:
3,3'-dihydroxy-benzidine;
bis(3-amino-4-hydroxy)-biphenyl;
1,2-bis(3-hydroxy-4-amino-phenyl) ethane;
2,2-bis(3-hydroxy-4-amino-phenyl) propane;
bis(3-hydroxy-4-amino-phenyl)bis(trifluoromethyl) methane;
bis(3-hydroxy-4-amino-phenyl) ether;
bis(3-hydroxy-4-amino-phenyl) sulphide;

bis(3-hydroxy-4-amino-phenyl) sulphone;
bis(3-hydroxy-4-amino-phenyl) ketone;
bis(3-hydroxy-4-amino-phenyl) methane;
(3-hydroxy-4-amino-phenyl)-3-hydroxy-4-amino;
bis(3-amino-4-hydroxy-phenyl) ether;
bis(3-amino-4-hydroxy-phenyl) sulphone;
bis(3-amino-4-hydroxy-phenyl) sulphide;
bis(3-amino-4-hydroxy-phenyl) ketone;
bis(3-amino-4-hydroxy-phenyl) methane;
1,2-bis(3-amino-4-hydroxy-phenyl) ethane;
2,2-bis(3-amino-4-hydroxy-phenyl) propane;
1,5-diamino-2,6-naphthalene diol;
1,6-diamino-2,5-naphthalene diol;
2,5-diamino-1,6-naphthalene diol;
2,6-diamino-1,5-naphthalene diol;
1,6-diamino-2,7-dihydroxy-naphthalene;
2,5-diamino-1,7-dihydroxy-naphthalene;
1,7-diamino-2,6-dihydroxy-naphthalene;
2,7-diamino-1,6-dihydroxy-naphthalene;
2,7-diamino-3,6-dihydroxy-naphthalene;
3,7-diamino-2,6-dihydroxy-naphthalene;
1,5-diamino-4,8-dihydroxy-naphthalene;
1,5-diamino-2,6-dihydroxy-anthracene;
1,8-diamino-2,7-dihydroxy-phenanthrene;
1,4-diamino-2,5-dihydroxy-benzene;
and 1,3-diamino-4,6-dihydroxy-benzene.

7. A method as claimed in claim 5, in which said alkoxyl diamine is a methoxyl diamine.

8. A method as claimed in claim 2, in which said compound of dicarboxylic acid is selected from the group consisting of
malonic acid;
succinic acid;
glutaric acid;
adipic acid;
pimelic acid
suberic acid;
azaleic acid;
sebacic acid
nonane-dicarboxylic acid and higher homologue acids;
isophthalic acid;
terephthalic acid;
biphenyl-3,3'-dicarboxylic acid
biphenyl-4,4'-dicarboxylic acid;
bis(3-carboxy-phenyl) methane;
bis(4-carboxy-phenyl) methane;
2,2-bis(3-carboxy-phenyl) propane;
2,2-bis(4-carboxy-phenyl) propane;
naphthalene-2,6-dicarboxyl;
bis(3-carboxy-phenyl) ether;
bis(4-carboxy-phenyl) ether;
bis(3-carboxy-phenyl) sulphide;
bis(4-carboxy-phenyl) sulphide;
bis(3-carboxy-phenyl) sulphone; and
bis(4-carboxy-phenyl) sulphone.

9. A method as claimed in claim 2, in which said compound of a dicarboxylic acid is a member selected from the group consisting of dihalogenide and aryl diester.

10. A method as claimed in claim 2, in which said compound of a tricarboxylic acid is a member selected from the group consisting of
benzene-1,3,5-tricarboxylic acid;
benzene-1,2,3-tricarboxylic acid;
benzene-1,2,5-tricarboxylic acid;
biphenyl-2,4,4'-tricarboxylic acid;
biphenyl-2,3,4'-tricarboxylic acid;
biphenyl-2,4,3'-tricarboxylic acid;
biphenyl-3,4,4'-tricarboxyl sulphone;
anthracene-1,2,4-tricarboxylic acid;
naphthalene-1,2,7-tricarboxylic acid;
naphthalene-1,2,4-tricarboxylic acid;
naphthalene-1,4,5-tricarboxylic acid;
triphenyl-methane-2,2',2''-tricarboxylic acid; and
bis(2-carboxy-phenyl) acetic acid.

11. A method as claimed in claim 2, in which said compound of a tricarboxylic acid is a member selected from the group consisting of trihalogenide and aryl triester.

12. A method as claimed in claim 2, in which said diamine is a hydroxyl or alkoxyl diamine and is poly-condensed in the molten state with a diester of dicarboxylic acid and a triester of tricarboxylic acid at a temperature of between 150° and 220° C.

13. A method as claimed in claim 2, in which said diamine is a hydroxyl diamine and is poly-condensed in the molten state with a diester of dicarboxylic acid so as to form a linear hydroxyl polyamide, said polyamide being then poly-condensed in the molten state with a triester of tricarboxylic acid at a temperature of between 150° and 220° C.

14. A method as claimed in claim 2, in which said diamine is a hydroxyl or alkoxyl diamine and is poly-condensed in solution with a dihalogenide of a dicarboxylic acid and a trihalogenide of a tricarboxylic acid in an organic solvent selected from the group consisting of dimethyl-acetamide, dimethyl-sulphoxide and N-methyl-pyrrolidone; in the presence of pyridine as an acceptor of the acid formed, at a temperature of between —10° and +50° C.

15. A method as claimed in claim 2, in which said diamine is a hydroxyl or alkoxyl diamine, and is subjected to an interfacial poly-condensation with a dihalogenide of a dicarboxylic acid and a trihalogenide of a tricarboxylic acid at a temperature of between —10° and +30° C. in the presence of a phase constituted by an organic solvent selected from the group consisting of ketone and halogenated aliphatic hydrocarbon, and another aqueous phase constituted by an aqueous solution of an alkali compound.

16. A method as claimed in claim 2, in which said diamine is a hydroxyl or alkoxyl diamine and is poly-condensed in the molten state with a diester of dicarboxylic acid so as to form a linear hydroxyl or alkoxyl polyamide, said linear polyamide being then poly-condensed in the molten state with a triester of tricarboxylic acid at a temperature of between 150° and 220° C.

17. A method as claimed in claim 2, in which said diamine is a hydroxyl or alkoxyl diamine and is subjected to an interfacial poly-condensation with a dihalogenide of dicarboxylic acid so as to form a linear polyamide, said linear polyamide being then poly-condensed in the molten state with a triester of tricarboxylic acid at a temperature of between 150° and 220° C.

18. A method as claimed in claim 3, in which the hydroxyl diamine is subjected to an interfacial poly-condensation with a dihalogenide of a dicarboxylic acid at a temperature of between —10° and +30° C. in the presence of a phase constituted by an organic solvent selected from the group consisting of ketone and halogenated aliphatic hydrocarbon, and of a further aqueous phase constituted by an aqueous solution of an alkali compound so as to form a linear polyamide, said linear polyamide being then poly-condensed in the molten state with a triester of tricarboxylic acid at a temperature of between 150° and 220° C.

19. A method as claimed in claim 3, in which the hydroxyl diamine is poly-condensed in solution with a dihalogenide of a dicarboxylic acid in an organic solvent selected from the group consisting of dimethyl-acetamide, dimethyl-sulphoxide and N-methyl-pyrrolidone, in the presence of pyridine as an acceptor of the acid formed, at a temperature of between —10° and +50° C. in order to form a linear hydroxyl polyamide, said linear polyamide being then poly-condensed in the molten state with a triester of tricarboxylic acid at a temperature comprised of 150° and 220° C.

20. Reticulated polyamide as claimed in claim 1, said ratio being between 1:20 and 1:5.

21. A method as claimed in claim 2, said ratio being between 1:20 and 1:5.

22. A method as claimed in claim 3, said ratio being between 1:20 and 1:5.

23. A method as claimed in claim 9, said compound of dicarboxylic acid being a member selected from the group consisting of phenol diester and naphthol diester.

24. A method as claimed in claim 11, said compound of a tricarboxylic acid being a member selected from the group consisting of phenol triester and naphthol triester.

25. A method as claimed in claim 2, in which said compound is an alkoxyl diisocyanate.

References Cited

UNITED STATES PATENTS

| | | | |
|---|---|---|---|
| 3,316,213 | 4/1967 | Berr | 260—47 |
| 3,332,907 | 7/1967 | Angelo et al. | 260—47 |
| 3,376,257 | 4/1968 | Nakanishi et al. | 260—47 |

WILLIAM H. SHORT, Primary Examiner

L. L. LEE, Assistant Examiner

U.S. Cl. X.R.

260—37 N, 49, 78 TF, 78.4 R, 78.4 E; 264—331